UNITED STATES PATENT OFFICE.

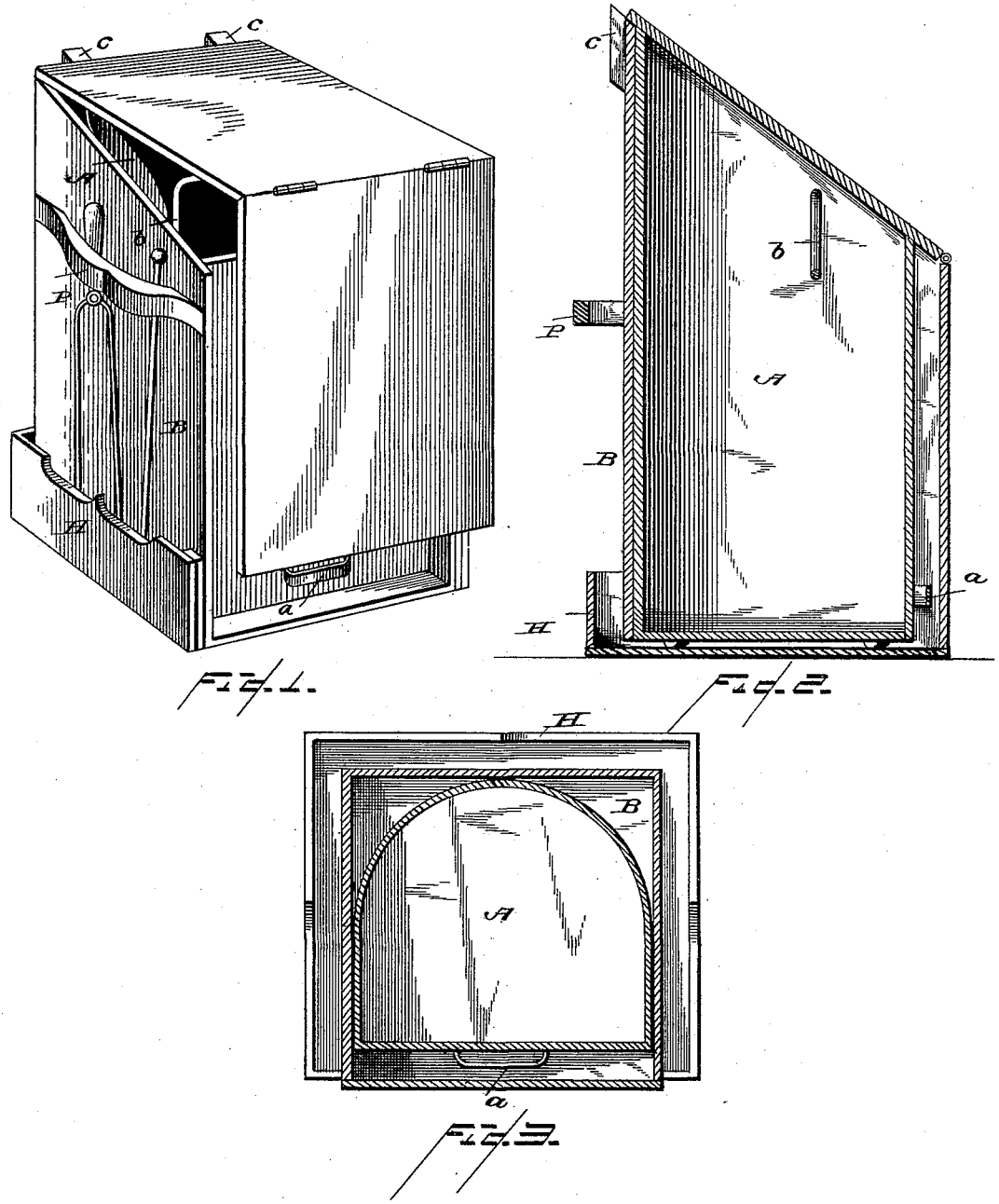

SARAH G. SMITH, OF CLEVELAND, OHIO.

HEARTH-CABINET.

SPECIFICATION forming part of Letters Patent No. 444,076, dated January 6, 1891.

Application filed September 8, 1887. Renewed August 25, 1890. Serial No. 362,974. (No model.)

*To all whom it may concern:*

Be it known that I, SARAH G. SMITH, a citizen of the United States, residing at Cleveland, in the county of Cuyahoga and State of Ohio, have invented certain new and useful Improvements in Hearth-Cabinets; and I do declare the following to be a full, clear, and exact description of the invention, such as will enable others skilled in the art to which it appertains to make and use the same.

This invention relates to outfits for stoves and fire-places, and is designed as an improvement upon the devices described and claimed in Letters Patent granted to me October 18, 1887, and numbered 371,714.

The improvement will be fully understood from the following description and claims when taken in connection with the annexed drawings, in which—

Figure 1 is a perspective view of my hod-cabinet, showing the covers partly raised to expose the hod therein. Fig. 2 is a vertical sectional view of the same, showing the covers closed; and Fig. 3 is a horizontal sectional view.

Referring by letter to the annexed drawings, A indicates my coal-hod, which is preferably rectangular in shape, its rear being oval and with a closed bottom, preferably on rollers, and open top, the latter being inclined downward from rear to front, as shown. This coal-hod is of a size adapted to nearly fill the inside of the receptacle hereinafter described, and its front wall is provided with a lifting-handle, (marked *a*,) while to its top is affixed a pivoted lifting-bail, (marked *b* on the drawings.) This hod is operated by grasping the handle *a* with one hand and the bail *b* with the other.

The letter B represents my receptacle, which is preferably rectangular in shape, with closed sides, rear, and bottom, open front, and oblique open top, as shown. It is also provided with a cover hinged at its rear and center in the manner illustrated on Fig. 1 of the drawings, to the end that when lowered down the top portion of same cover will rest upon the oblique tops of the side walls, while its lower section will fold over the front of the coal-hod and form a front wall for the receptacle, closing the hod from view. When raised and thrown back upward, the lower section of the cover rests upon the upper section, while the latter is sustained by the stops *c c*, affixed in the rear wall of the receptacle. At the side and sometimes in the rear of the receptacle I form recesses and holding-ears for a kit of fire-place and stove utensils, such as poker, shovel, tongs, broom, &c. These recesses and ears are represented on the drawings by the letters H and P. It is obvious that the open front of the receptacle may be closed by means of a swinging door in front; but I do not claim such in the present application, but reserve the right of making separate application therefor. The said receptacle may be made separate and independent of the fire-set holder, using the common handles for lifting the receptacle. By means of this open-front receptacle the coal-hod, which is provided with rollers, is easily and readily removed by simply rolling the hod out of the receptacle, instead of lifting it up out over the top thereof, as is now in use.

Having described this invention, what I claim is—

The combination, with the main receptacle having an obliquely-opened top and a vertically-open communicating front, and also a base-recess and side loops, of the double-hinged cover for the top and front of the said receptacle, and the hod having its top cut obliquely and mounted on rollers, whereby the same may be rolled out and in on the floor of the receptacle when the cover has been raised, substantially as specified.

In testimony whereof I affix my signature in presence of two witnesses.

SARAH G. SMITH.

Witnesses:
FRANK N. WILCOX,
IRIS C. SMITH.